US006484938B1

(12) United States Patent
Shepherd et al.

(10) Patent No.: US 6,484,938 B1
(45) Date of Patent: Nov. 26, 2002

(54) SELF-SERVICE TERMINAL HAVING A CASSETTE AND METHOD OF REPLENISHING THE CASSETTE WITH SHEET CURRENCY

(75) Inventors: Alan G. Shepherd, Dundee (GB); John A. Peebles, Dundee (GB); Andrew Calder, Dundee (GB); Norman G. Taylor, Dundee (GB); Ian McIntyre, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/433,142

(22) Filed: Nov. 3, 1999

(30) Foreign Application Priority Data

Nov. 20, 1998 (GB) .......................................... 9825510

(51) Int. Cl.[7] .......................... G06F 7/08; B65H 31/00; E05G 1/00

(52) U.S. Cl. .......................... 235/381; 902/9; 271/207

(58) Field of Search .............................. 235/379, 381; 902/8–15, 22; 705/34, 42, 43; 271/278, 207–224

(56) References Cited

U.S. PATENT DOCUMENTS

| | | | | | |
|---|---|---|---|---|---|
| 4,166,945 | A | * | 9/1979 | Inoyama et al. | 235/379 |
| 4,438,326 | A | * | 3/1984 | Uchida | 235/379 |
| 4,501,416 | A | * | 2/1985 | Hain | 235/379 |
| 4,655,368 | A | * | 4/1987 | Bateman et al. | 221/4 |
| 4,704,061 | A | * | 11/1987 | Peebles | 902/13 |
| 5,288,066 | A | * | 2/1994 | Hain | 271/181 |
| 5,439,209 | A | | 8/1995 | Rünzi | 271/251 |
| 5,626,822 | A | * | 5/1997 | Kadowski et al. | 235/379 |
| 6,014,649 | A | * | 1/2000 | Kobayashi et al. | 705/43 |
| 6,065,672 | A | * | 5/2000 | Haycock | 235/379 |
| 6,264,101 | B1 | * | 7/2001 | Ryan et al. | 235/379 |

FOREIGN PATENT DOCUMENTS

| | | |
|---|---|---|
| EP | 0109743 | 5/1984 |
| EP | 0700022 | 3/1996 |
| GB | 2105507 | 3/1983 |
| GB | 2220646 | 1/1990 |
| GB | 2246656 | 2/1992 |

* cited by examiner

*Primary Examiner*—Karl D. Frech
*Assistant Examiner*—Jamara A. Franklin
(74) *Attorney, Agent, or Firm*—Gregory A. Welte

(57) ABSTRACT

A self-service terminal (SST) 10 has a user interface (12,14), a bank note receiver (16) where a user may input bank notes, and a bank note validator (18) for checking the bank notes received from the user (the user's bank notes). The terminal (10) also has a cassette receiver (36) for holding a cassette (34) which is to be replenished with the user's bank notes. A loading mechanism (32) is used to replenish the cassette (34) with the validated user's bank notes. The loading mechanism (32) has a pivoting linkage arrangement so that as the bank notes are stacked in the cassette (34), part of the linkage remains parallel to the stack of bank notes. The SST (10) also has a cassette emptying mechanism (38) for emptying and reconciling partially-filled cassettes (39). A method of replenishing a cassette with bank notes and an SST system are also described.

16 Claims, 5 Drawing Sheets

SELF-SERVICE TERMINAL HAVING A CASSETTE AND METHOD OF REPLENISHING THE CASSETTE WITH SHEET CURRENCY

BACKGROUND OF THE INVENTION

The invention relates to a self-service terminal (SST), and particularly to an SST for replenishing and/or reconciling currency cassettes.

Currency cassettes are used as the currency source in Automated Teller Machines (ATMs). The resources required to replenish (refill with currency) and reconcile (check that the number of bank notes dispensed equals the number of bank notes which were originally in the cassette) these cassettes are a major cost to the owners of ATMs. Conventionally, currency cassettes are replenished at central points which serve an ATM network (which may include up to several hundred ATMs).

A currency cassette requires reconciling and replenishing when its supply of currency falls below a predetermined value. When this occurs, the partially filled (below the predetermined value) cassette is removed from an ATM and replaced with a full cassette; the partially filled cassette is then transported by a secure carrier to the central point for replenishing.

High costs are incurred because of the need for high security in transporting currency both to and from an ATM. A financial center may have a large amount of currency which has to be transported to the central point for replenishing an ATM, but that financial center may house the ATM which is to be replenished. Thus, in some cases, a cassette from an ATM and currency from a financial center in which the ATM is located are both transported under high security to a remote center which loads the transported currency into the transported cassette to provide a replenished cassette, and the replenished cassette is then transported back to the financial center under high security.

SUMMARY OF THE INVENTION

It is an object of the invention to obviate or mitigate one or more of the above disadvantages.

According to the invention a self-service terminal comprises: a user interface; a media receiver for receiving valuable media items; a validator for checking the valuable media items received by the media receiver; characterized in that the terminal further comprises a cassette receiver for holding a cassette to be replenished; and a loading mechanism for replenishing the cassette with the validated valuable media items.

It will be appreciated that a cassette is replenished when it is filled with authentic media items, and is ready for loading into an SST without requiring any intermediate processing steps such as sorting the media items stored in the cassette.

By virtue of the invention a terminal is provided which may have similar dimensions to a conventional ATM, or which may be desktop in size. The terminal facilitates replenishing of a currency cassette by a user so that financial centers such as retail outlets and banks may use this type of terminal to replenish cassettes used in local ATMs and thereby minimize the transportation of currency.

The terminal may have a plurality of cassette receivers so that different types of media items can be stored. For example, one cassette may store one denomination of currency, and a second cassette may store a different denomination of currency.

Preferably, the validator checks the valuable media items by implementing one or more predetermined acceptance criterion.

Preferably, the validator includes media identification apparatus which may include measuring apparatus for measuring the dimensions of each media item to discriminate between different types of media items (for example different denominations of currency) and/or to verify that the media item is authentic (for example by comparing the measured dimensions of the media item with pre-stored dimensions for that media item).

Preferably, the validator includes counterfeit detection apparatus. Various types of counterfeit detection apparatus may be used depending on the type of media item to be dispensed and the security features used in that media item.

Preferably, the terminal further comprises a condition sorter for checking characteristics of each media item received. If a received media item does not fulfill a predetermined condition acceptance criterion then the media item may be rejected. The characteristics that may be checked include the porosity of the media item, and whether the media item is free from tears, cuts, folds, creases, or other such defects.

The terminal may further comprise a cassette reader mechanism for use with cassettes having an identifier which records, for example, the type of media item stored, the number of media items stored in a full cassette, and the number of media items stored in the cassette when it is removed from a terminal (if it is removed when it is partially full). The terminal may have a programmer for writing information to a cassette identifier. The terminal may be in communication with a network of SSTs, thereby enabling the terminal to communicate with another SST to determine the type of media items and the number of media items to be stored in the cassette.

Preferably, the cassette receiver is arranged to hold a cassette in an inclined position to facilitate loading of valuable media items into the cassette.

Preferably, the cassette receiver is operable to detect the presence of a cassette which has been loaded into it and to bring the loaded cassette to an inclined position to facilitate loading of media items into the cassette. The cassette receiver may also automatically remove the lid of the cassette.

Preferably, the loading mechanism has a media conveyor for delivering media items to a cassette, and a conveyor deflector configured so that when a media item is present the media item co-operates with the conveyor deflector to displace at least part of the conveyor from a first (non-deflected) position to a second (deflected) position in which stacking of the media item in the cassette is facilitated by allowing the media item to be stacked to pass between the top of the media items stack and the raised part of the conveyor.

Preferably, the media conveyor has a pivoting linkage arrangement whereby a pivoting portion of the linkage may move in an arcuate path between the top and the bottom of the cassette; whereas, a parallel portion of the linkage maintains an orientation parallel to the orientation in which a media item is to be stacked.

The parallel portion of the linkage is located in the cassette and is aligned so that, in use, the orientation is parallel to and resting on the stack of media items in the cassette.

Preferably, the media conveyor has an arrangement of stretchable, endless conveyor belts, at least one (upper) belt extending from the pivoting portion of the linkage to the parallel portion of the linkage and being in contact with a surface onto which a media item is to be stacked. The surface onto which a media item is to be stacked will initially be a pusher plate in the cassette, but when one item of media is stacked on the pusher plate the surface will be the last media item stacked.

Preferably, the media conveyor is counterbalanced to provide only a small net downward force on the last media item stacked.

Preferably, the media deflector comprises a low-friction plate having at least one slot in a surface inclined with respect to the at least one upper conveyor belt, the plate being located below the at least one upper conveyor belt such that the at least one upper conveyor belt passes through the at least one slot.

The upper conveyor belt rests on the media stack and transports media items beneath it, therefore the loading mechanism automatically rises as a media item is stacked. As the upper conveyor is driven it acts to urge the media items stack against a back wall of the cassette because the belt rests on the media items stack.

Preferably, the terminal further comprises a cassette tray for receiving a cassette to be emptied, and an emptying mechanism for removing media items from a cassette inserted into the cassette tray. The emptying mechanism may be a conventional pick mechanism.

Preferably, the terminal is operable to count the number of media items removed from a cassette to be emptied whereby the contents of the cassette to be emptied can be reconciled.

Also according to the invention a method of replenishing a cassette with valuable media items in an SST is characterized by the steps of: retaining the cassette in a position for receiving media items; receiving media items to be used in replenishing the cassette; validating the received media items; and loading the validated media items into the cassette to replenish the cassette.

The step of validating the received media items includes checking characteristics of the received media items, so that the media items are rejected if they do not fulfill one or more predetermined acceptance criterion.

Further according to the invention a self-service terminal system comprises: a user interface; a media receiver for receiving valuable media items; and a validator for checking the valuable media items received by the media receiver; characterized in that the terminal retains a cassette in a position for being replenished with valuable media items; and replenishes the cassette with validated valuable media items using a loading mechanism which moves between a top and bottom of the cassette.

BRIEF DESCRIPTION OF THE DRAWINGS

An embodiment of the invention will now be described with reference to the accompanying drawings, in which.

DETAILED DESCRIPTION

Figure 1:
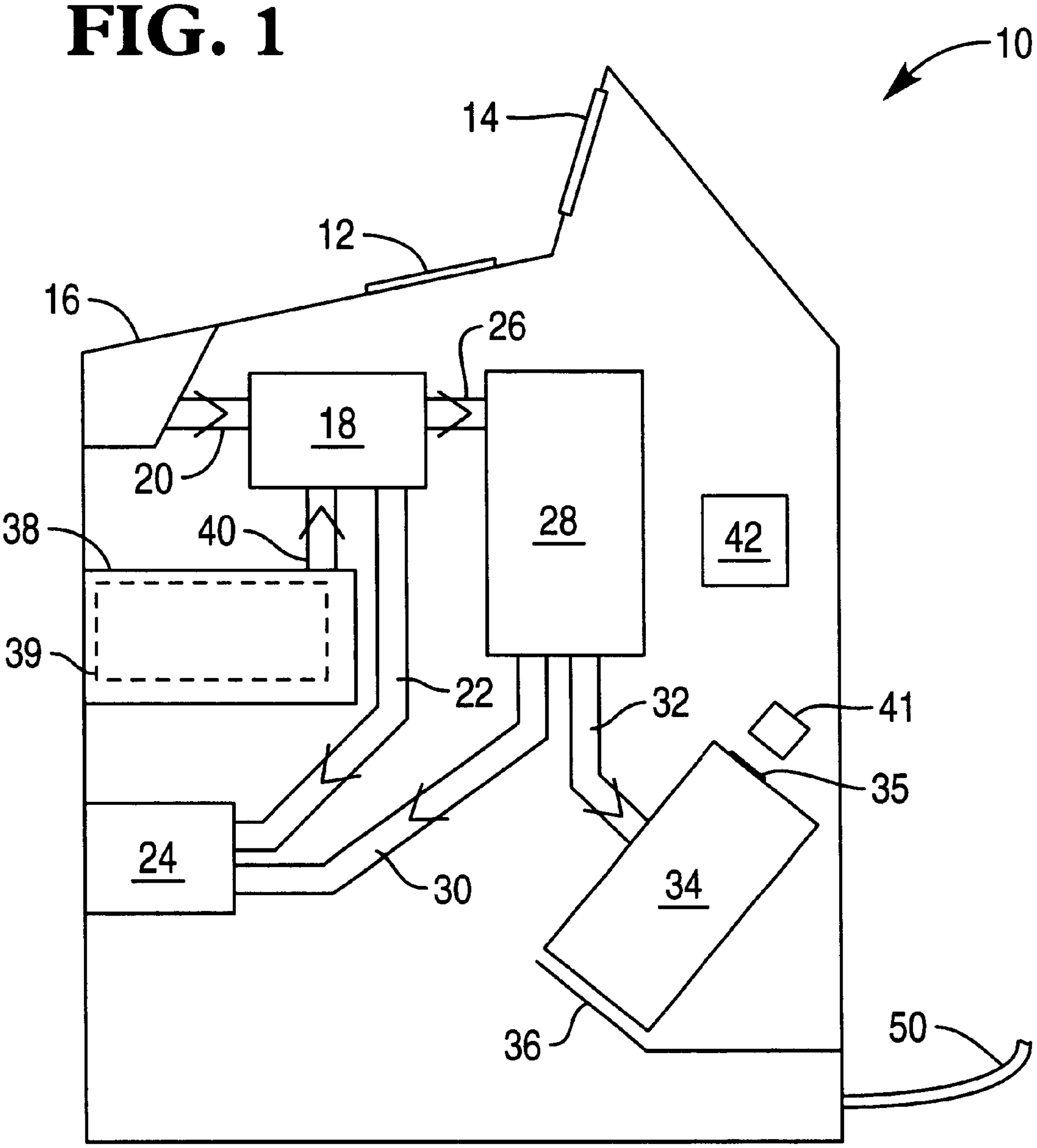
FIG. 1 is a schematic diagram of an SST according to one embodiment of the invention.

Referring to FIG. 1, an SST 10 has a user interface (comprising a keyboard 12 and a display 14) and a media receiver 16 for receiving valuable media items in the form of bank notes which may be input individually or as a bunch.

The bank notes are transported individually from the receiver 16 to a validator 18 by a note conveyor 20, which may be an arrangement of stretchable endless belts.

The validator 18 has a multiple note detect stage for detecting and rejecting multiple notes and for allowing single notes to pass to the examination stage in the validator 18. In the validation stage, the validator 18 examines each single bank note to check that the note is authentic. A number of examination techniques are known, and various validator algorithms are available. For example, the validator 18 may measure the lateral dimensions of the note. The validator may also implement some counterfeit detection algorithm.

The validator 18 has a reject note output conveyor 22 for transporting notes which fail the multiple note detect stage and for transporting notes which fail the examination stage to a reject note dispenser 24. The validator 18 also has a validated note conveyor 26 for transporting valid notes to a note condition sorter 28.

The note condition sorter 28 examines each validated note to check that each note fulfills a predetermined condition acceptance criterion. For example, each note may require to be free from tears, or may require to have a certain predetermined porosity. The condition sorter 28 has a reject conveyor 30 for transporting notes failing the note condition examination to the reject note dispenser 24. The condition sorter 28 also has a loading mechanism 32 for loading notes which pass the note condition examination into a cassette to be replenished 34.

The cassette to be replenished 34 is retained in the SST 10 in an inclined position (at an angle of 60 degrees to the horizontal) by a cassette receiver 36. The SST 10 also has a cassette tray 38 for receiving a cassette to be emptied 39. An emptying mechanism 40 in the form of a conventional pick mechanism is used to remove bank notes from a cassette 39 inserted into the cassette tray 38 and transport these removed notes to the validator 18.

A cassette reader mechanism 41 is located in the SST 10 for use with cassettes 34 having an identifier 35. A cassette identifier 35 typically records the type of media items, the number of media items stored in the cassette 34 when full, and the number of media items stored in the cassette 34 when partially full (i.e. if it is removed from an ATM before it is completely empty). The cassette reader mechanism 41 includes a programmer for writing information to a cassette identifier 35.

The SST 10 also has a processor 42 in the form of a microcomputer for controlling and operating the user interface (12 and 14), receiver 16, validator 18, reject note dispenser 24, sorter 28, loading mechanism 32, conveyors 20,22,26,30, cassette receiver 36, and cassette reader mechanism 41. The SST 10 has a communication link 50 for communicating with other SSTs in a network. The microcomputer 42 and communication link 50 are not shown connected to any of the blocks (e.g. blocks 16,18,28,36) in FIG. 1 because FIG. 1 illustrates the physical arrangement rather than the electrical interconnection of the SST 10.

Figure 2:
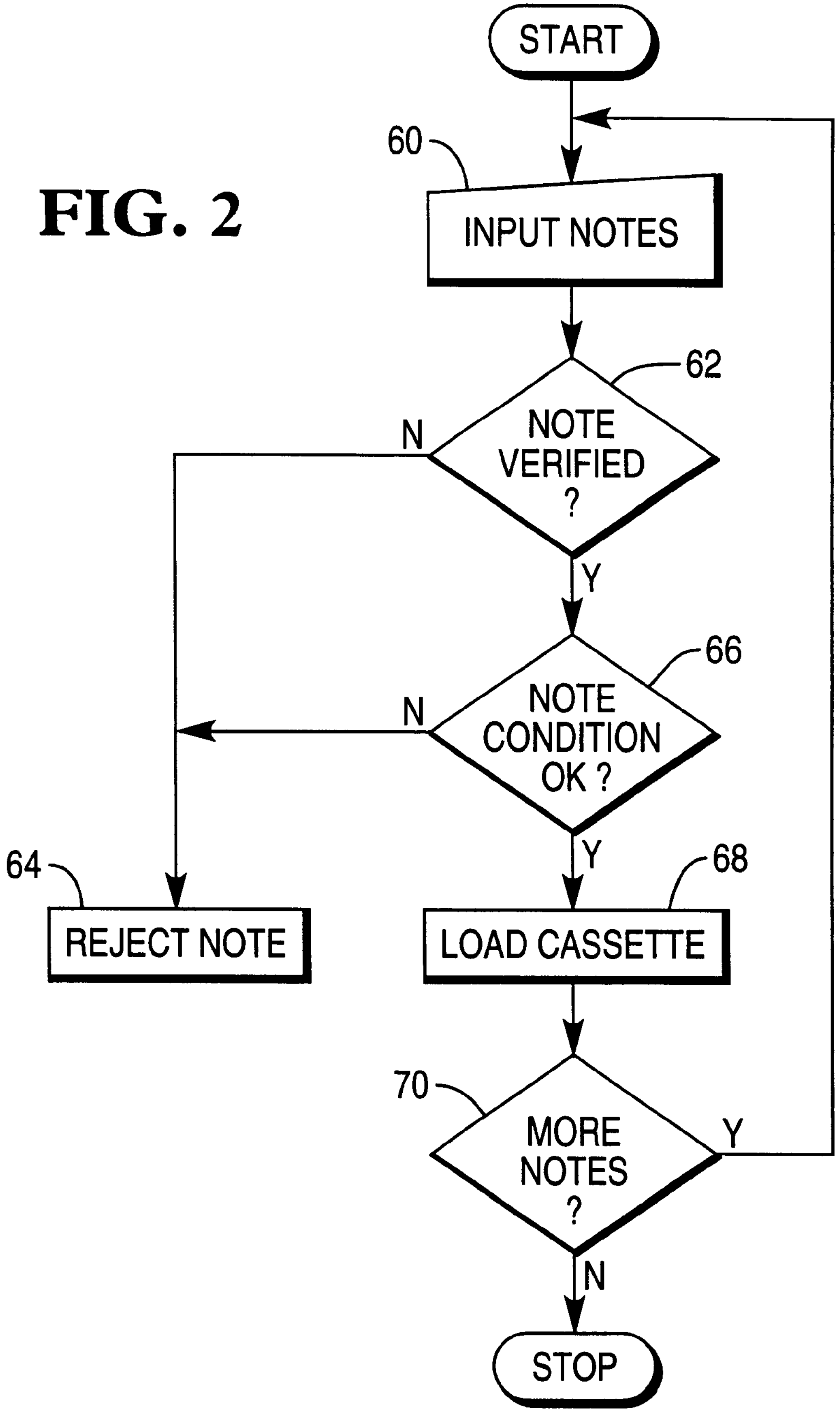
FIG. 2 is a flowchart showing the process steps involved in receiving and loading notes in the terminal of FIG. 1.

The operation of the SST 10 will now be described with reference to FIGS. 1 and 2. An authorized operator places an empty cassette to be replenished 34 into the entrance of the cassette receiver 36. The cassette receiver 36 automatically detects the cassette 34, removes the lid of the cassette 34, inclines the cassette 34 at an angle of approximately 60 degrees to the horizontal, and brings the loading mechanism 32 into engagement with the cassette 34.

The cassette reader mechanism 41 reads information contained in the identifier 35 to determine the type of media items and the number of media items to be stored in the cassette 34. The display 14 then informs a user about the type of media items required (in this embodiment the denomination of bank notes) and the number of media items needed to fill the cassette 34.

A user may then initiate replenishing of the cassette 34 by inputting the required quantity and denomination of notes (step 60) to the receiver 16. These notes are individually conveyed to the validator 18 by note conveyor 20. The validator 18 individually examines each bank note to verify that the note is authentic (step 62). Notes which fail the validation are rejected (step 64) and transported by conveyor 22 to the reject bin 24. Notes which pass the validation are transported by conveyor 26 to the note condition sorter 28 which examines (step 66) each validated note to check that it fulfills a predetermined acceptance criterion.

The notes which fail the condition sorter examination are rejected (step 64) and transported by conveyor 30 to the reject bin 24. The notes which pass the condition sorter examination are loaded (step 68) into the cassette 34 by loading mechanism 32.

If the cassette 34 is not full after all of the notes input by the user have been loaded, then the SST 10 notifies the user that the cassette 34 is not full and asks if the user intends inputting more notes (step 70). If the user inputs more notes then the procedure is repeated, otherwise the cassette 34 may be left in the terminal 10 until a later time when more notes are to be input or the cassette 34 may be removed (in some circumstances only a partially filled cassette 34 may be required). When the cassette 34 is full the cassette receiver 36 automatically replaces the lid and moves the cassette 34 to an exit position where it may be withdrawn by an authorized operator.

It is anticipated that in this embodiment the user of the SST 10 may be a person who has access to sufficient quantities of high quality bank notes suitable for dispensing from an ATM.

Figure 3:
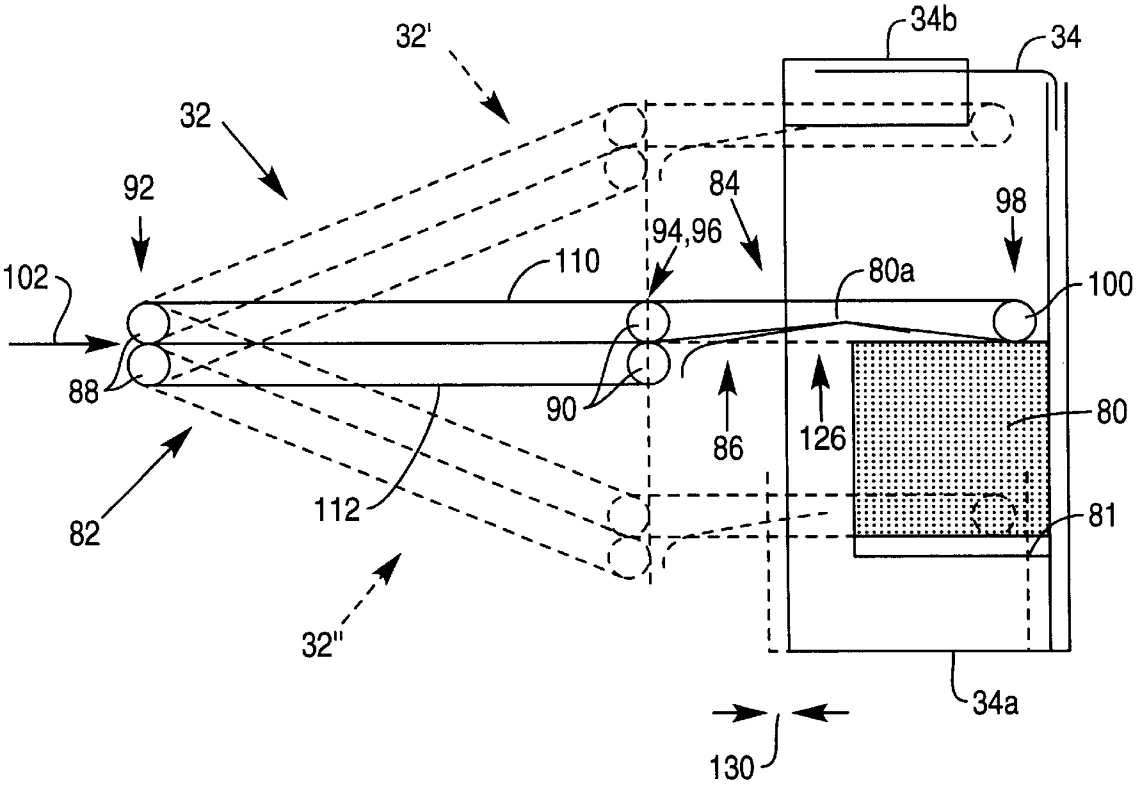
FIG. 3 is a diagram illustrating the operation of the cassette loading mechanism of FIG. 1.

FIG. 3 is a diagram illustrating the operation of the cassette loading mechanism 32 of FIG. 1. FIG. 3 shows loading mechanism 32 located in a central position and delivering a bank note 80a to cassette 34 which is partly filled with notes 80 stacked on a pusher plate 81 latched back into the loading position. FIG. 3 shows in dotted lines the loading mechanism 32' in an upper position (where the cassette 34 is full of notes 80) and the loading mechanism 32" in a lower position (where the cassette 34 is empty).

The loading mechanism 32 comprises a media conveyor (having a pivoting portion 82 and a parallel portion 84) and a conveyor deflector 86.

The pivoting portion 82 is pivotably mounted to twin axles 88,90 at each of its ends 92,94. End 92 receives notes 80 from the condition sorter 28 (FIG. 1).

End 94 is pivotably coupled to the parallel portion 84. One end 96 of the parallel portion 84 supports the twin axles 90, and the opposite end 98 of the parallel portion 84 supports axle 100, such that each of the axles 90,100 is free to rotate about its axis.

The media conveyor (82,84) has three upper belts 110 extending from end 92 to end 98 and spaced along axle 100 and the upper axle of twin axle 88; and three lower belts 112 extending from end 92 to end 94 and spaced along the lower axles of twin axles 88,90.

End 98 rests on the stack of notes 80. The upper and lower belts 110,112 move in the direction of arrow 102 and individual notes 80 are transported by belts 110,112 between twin axles 88 and between twin axles 90 and are delivered to the conveyor deflector 86.

Figure 4:
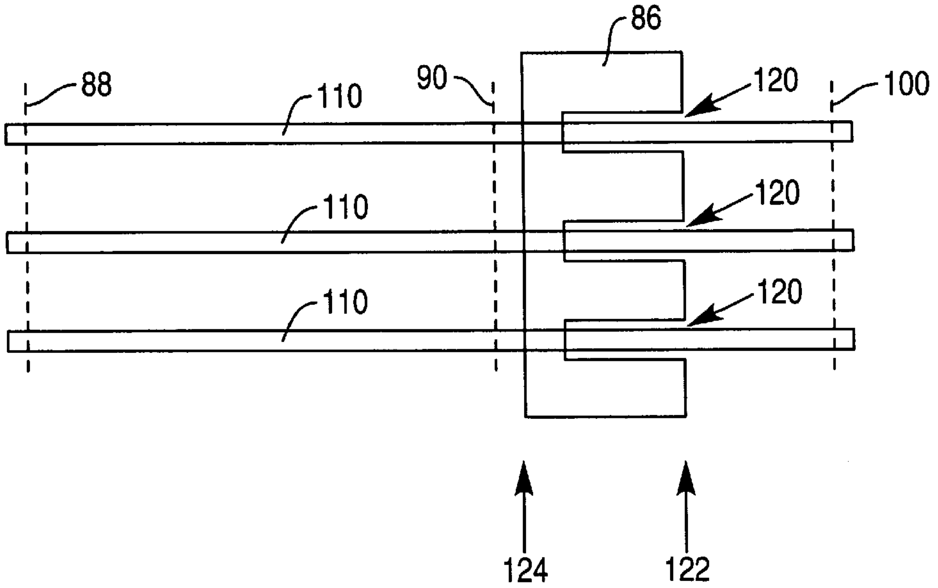
FIG. 4 is a plan view of part of the mechanism of FIG. 3.
Figure 5:
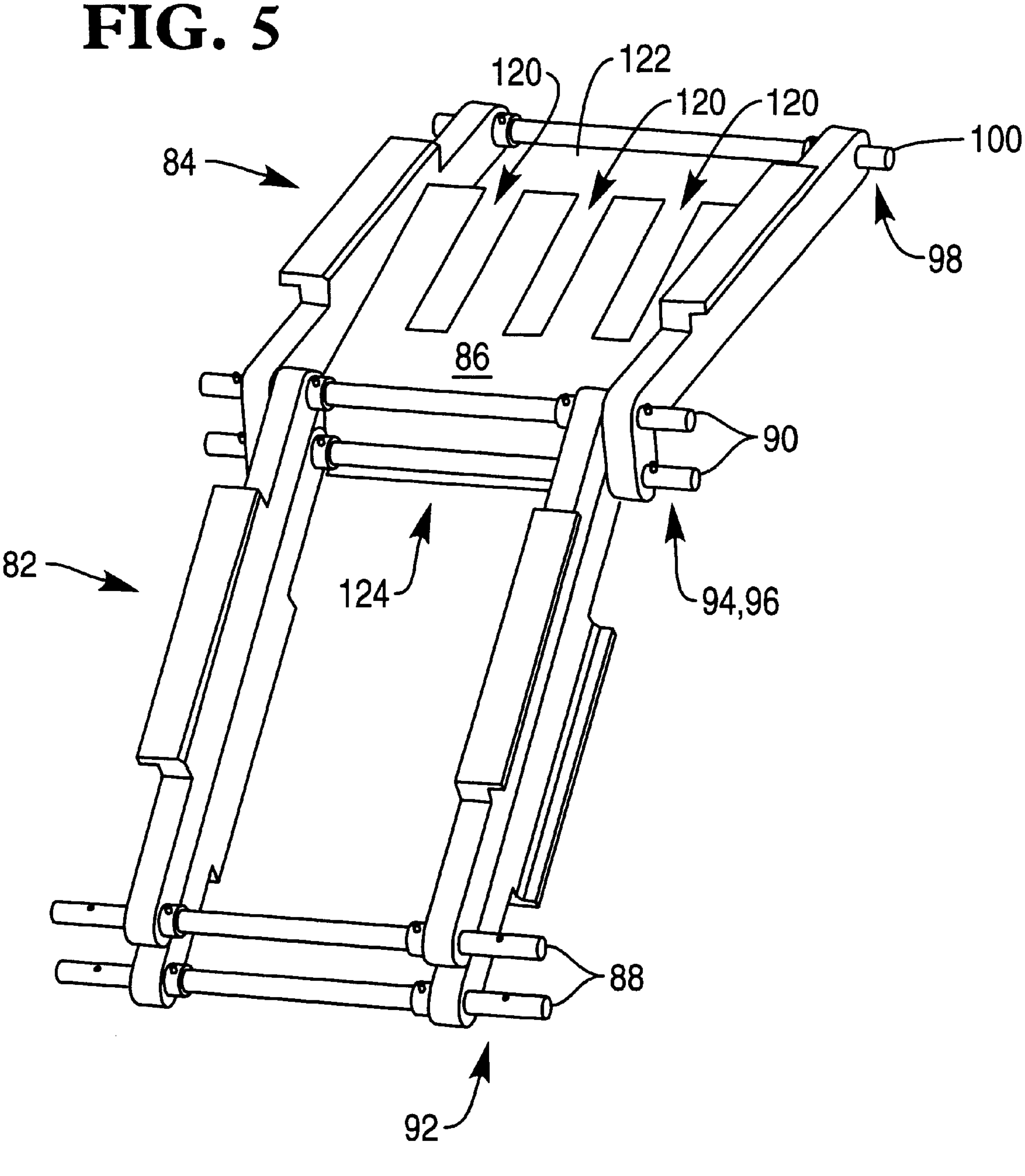
FIG. 5 is a perspective view of part of the mechanism of FIG. 3.

The conveyor deflector 86 is shown in more detail in FIGS. 4 and 5. For clarity, in FIG. 4 the lower belts 112 are not shown and the axles 88,90,100 are only shown as dotted lines.

None of the belts 110,112 is shown in FIG. 5, to aid clarity. The deflector 86 is in the form of a profiled plate having three slots 120 defined in the delivery end 122 (the part of the plate nearest the stack of notes 80).

The plate 86 is inclined relative to the belts 110 with the lowest part of the plate 86 being the receiving end 124 (the part of plate 86 nearest end 96) and the highest part of the plate 86 being the delivery end 122 so that each of the three upper belts 110 passes through a respective slot 120, as shown in FIG. 4. The length of the slots 120 is such that when no notes 80 are present on the plate 86 the upper belts 110 may pass through the slots 120 without being in contact with the plate 86 (i.e. the upper belts 110 are non-deflected) as shown by dotted line 126 in FIG. 3.

The receiving end 124 of plate 86 is curved downwards to aid transportation of a note 80 from the pivoting portion 82 to the parallel portion 84. The delivery end 122 is located a short distance (e.g. 5 mm) from the edge of the stack of notes 80 so that there is a gap between the delivery end 122 and the stack of notes 80.

As a note 80*a* (FIG. 3) is transported over the plate 86 towards delivery end 122, the note 80*a* begins to cover the slots 120 and thereby begins to displace (raise) the lower portions of the upper belts 110. As the note 80*a* moves along the plate 86 and covers a larger amount of each slot 120 the displacement increases. Maximum displacement occurs when the note 80*a* covers delivery end 122. Thus, note 80*a* and plate 86 co-operate to displace the lower portions of the upper belts 110.

Figure 6A:
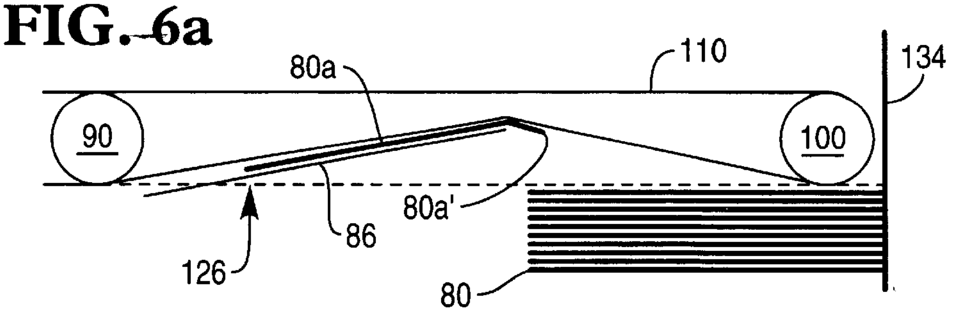
FIGS. 6*a* to 6*e* show a media item at various stages of transportation in the mechanism of FIG. 3.
Figure 6B:
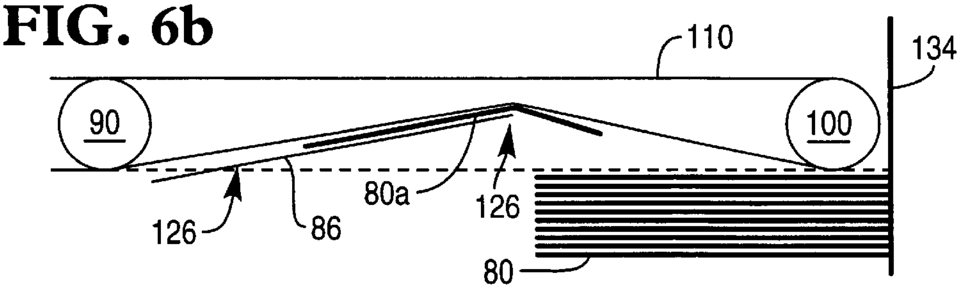
Figure 6C:
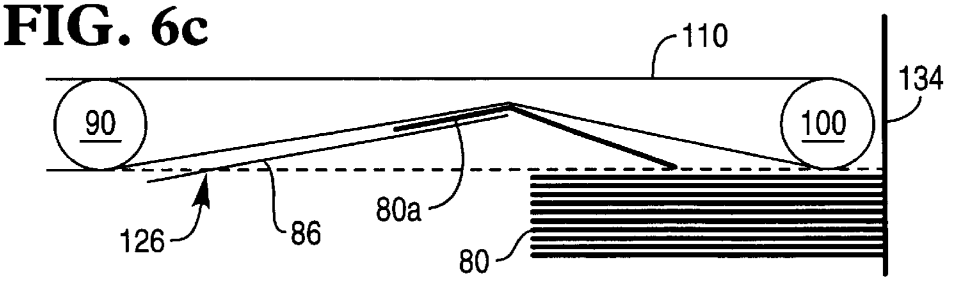
Figure 6D:
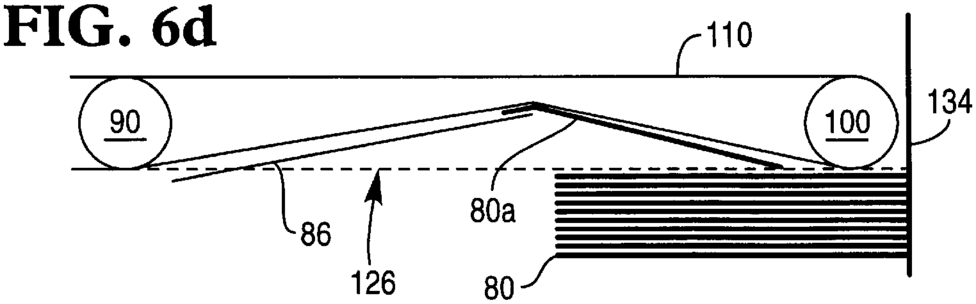
Figure 6E:
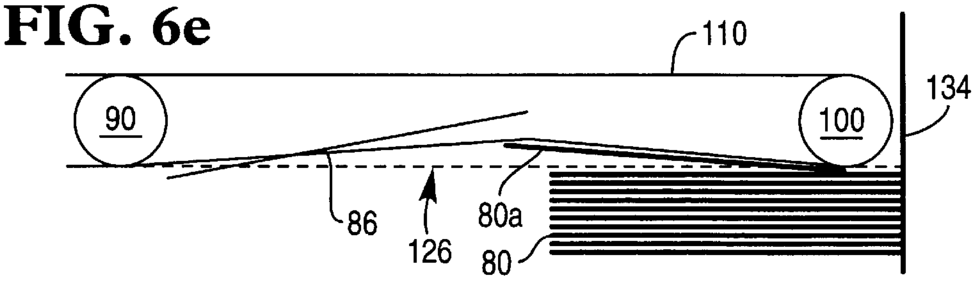

FIGS. 6*a* to 6*e* show note 80*a* at various stages of transportation between plate 86 and the stack of notes 80 which are located adjacent a rear wall 134 of the cassette 34. When note 80*a* overhangs delivery end 122 (FIG. 6a) the front end (80*a*') of note 80*a* begins to move out of contact with belts 110. As note 80*a* is transported further towards the stack of notes, less of the note 80*a* is in contact with the belts 110, as shown by FIGS. 6*b* and 6*c*. However, before note 80*a* loses contact with belts 110 and plate 86, the front end 80*a*' of note 80*a* comes into contact with the stack of notes 80, as shown in FIG. 6*d*. When note 80*a* is transported beyond end 122, belts 110 move back down the slots 120 to the non-displaced position (shown by dotted line 126). As the belts 110 move downwards they come into contact with note 80*a* and urge it towards the rear wall 134 of the cassette 34, thereby neatly stacking note 80*a* on top of the stack of notes 80.

The top note in the stack of notes 80 is constantly urged towards the rear wall 134 of the cassette 34 by the belts 110. This ensures that the top note in the stack does not hinder delivery of other notes. The parallel portion 84 is counter-balanced to provide a light net downward force on the stack of notes 80. The size of the light net downward force is chosen so that the movement of the belts 110 do not cause crumpling or deformation of the top note in the stack; but do provide some urging of the top note to the rear wall 134 of the cassette 34.

Thus, the belts 110 and plate 86 ensure that a note 80*a* is delivered to the top of the stack of notes 80. It will be appreciated that the above arrangement causes the parallel portion 84 to rise automatically as notes 80 are added to the stack because the added notes are inserted between the belts 110 and the stack of notes 80.

Referring again to FIG. 3, when a cassette 34 is empty, the loading mechanism is in the position shown by dotted lines 32", near the bottom 34*a* of the cassette 34. As notes are delivered to the cassette 34 they are automatically stacked. During the stacking process the parallel portion 84 remains parallel to the topmost note in the stack of notes 80.

Eventually, the cassette 34 is filled (as shown in FIG. 3 by dotted lines 32' which are near to the top 34*b* of the cassette 34) and the processor 42 instructs the loading mechanism 32 to cease transporting notes 80 to the cassette 34. The cassette 34 is filled when the number of notes 80 in the cassette 34 equals the number of notes the cassette 34 can store (the storage capacity as recorded in the identifier 35). The programmer in the cassette reader mechanism 41 then updates the identifier 35 so that the identifier 35 records the new number of notes 80 stored therein.

If the cassette 34 was partly filled with notes 80 when it was loaded into the SST 10, then the identifier 35 stores that initial information (i.e. the number of notes 80 initially stored in the partly-filled cassette 34), and the processor 42 ensures that only the required number of notes 80 (the difference between the storage capacity and the initial number of notes) are transported to the cassette 34.

As the pivoting portion 82 moves from the empty position 32" to the full position 32', end 94 follows an arcuate path. To compensate for this lateral movement of end 94 the cassette receiver 36 moves the cassette 34 laterally (as shown by arrows 130) to maintain a constant distance between end 94 and cassette 34.

Referring again to FIG. 1, if a user has a partially filled cassette 39 which is to be emptied then the user inserts this cassette 39 into cassette tray 38. The pick mechanism 40 detects the presence of the cassette 39, removes bank notes from the cassette 39 one at a time, and transports these removed notes to the validator 18. The microcomputer 42 counts the number of bank notes removed from the cassette 39 for reconciling the contents of the cassette 39 with the original (when full) contents of the cassette 39. When the cassette 39 has been emptied it may be removed by a user.

Various modifications may be made to the above described embodiments within the scope of the invention. Valuable media other than bank notes may be used, such as share certificates, flight coupons, stamps, and such like. The SST may include note recognition so that the SST automatically identifies the type of note entered by the user. The conveyors (e.g. 20,22,30) may be implemented by rollers or by suction devices. The reject note dispenser 24 may only be accessible to an authorized operator, so that any rejected media item is not returned to the user. The cassette receiver may be just a guide frame so that the operator must manually remove the lid of the cassette and load the cassette into the guide frame; in such an embodiment the cassette 34 may remain motionless and the loading mechanism 32 may move to compensate for the lateral movement of the end of the mechanism 32 between the empty and full positions. An optical sensor may be used to detect when the cassette to be replenished is full of notes and to notify the loading mechanism to stop transporting notes to the cassette. The number of notes required for to fill a cassette to be replenished may be obtained from an Automated Teller Machine (ATM) network host via the communication link 50. The identifier 35 may store information about which SST the cassette 34 is intended for. The terminal 10 may receive sufficient notes to fill more than one cassette 34, so that some cassettes 34 may be filled automatically with no user intervention except to load and remove the cassettes 34.

What is claimed is:

1. A self-service terminal comprising:

a user interface;

a receiver for receiving sheet currency from a person;

a validator for detecting counterfeit currency in the receiver;

a cassette receiver for holding a cassette to be replenished, said cassette having been removed from an Automated Teller Machine, ATM, and said cassette, when present in the cassette receiver, is located outside an ATM; and a loading mechanism for accepting validated, non-counterfeit currency from the receiver and replenishing the cassette with said validated currency.

2. A terminal according to claim 1, wherein the validator checks currency sheets by implementing one or more predetermined acceptance criteria.

3. A terminal according to claim 1, further comprising (i) a cassette tray for receiving a cassette to be emptied and (ii) a removal mechanism for removing sheets of currency from a cassette inserted into the cassette tray.

4. A terminal according to claim 3, further comprising means for counting the number of sheets of currency removed from the cassette to be emptied.

5. Terminal according to claim 3, wherein the receiver accepts currency sheets either individually or in a bunch.

6. A terminal according to claim 1, further comprising a cassette reader mechanism for use with a cassette having an identifier which records at least one of the type of sheet currency and the number of sheets of currency stored in the cassette.

7. A terminal according to claim 1, wherein the cassette receiver is operable to detect the presence of a cassette which has been loaded into the cassette receiver, and is operable to bring the loaded cassette to an inclined position to facilitate loading of media items into the cassette.

8. A self-service terminal comprising:

a user interface;

a receiver for receiving sheet currency from a person;

a validator for detecting counterfeit currency in the receiver;

a cassette receiver for holding a cassette to be replenished, said cassette being used by the terminal to dispense currency to customers; and a loading mechanism for accepting validated, non-counterfeit currency from the receiver and replenishing the cassette with said validated currency, wherein the loading mechanism includes (i) a conveyor for delivering sheet currency to a cassette, and (ii) a deflector configured such that when a sheet of currency is present the media item co-operates with the deflector to displace at least part of the conveyor from a non-deflected position to a deflected position in which stacking of the sheet currency in the cassette is facilitated by allowing the sheet currency to be stacked to pass between the top of the stack of sheet currency and a raised part of the conveyor.

9. A terminal according to claim 8, wherein the conveyor includes a pivoting linkage arrangement having a pivoting portion which is movable in an arcuate path between bottom and top of the cassette, and a parallel portion which maintains an orientation parallel to the orientation in which a sheet of currency is to be stacked.

10. A terminal according to claim 8, wherein the deflector includes a low-friction plate having at least one slot in a surface inclined with respect to at least one upper conveyor belt, the plate being located below the at least one upper conveyor belt such that the at least one upper conveyor belt passes through the at least one slot.

11. A self-service terminal system comprising:

a user interface;

a receiver for receiving sheet currency;

a validator for checking whether counterfeit currency was received by the receiver;

means for retaining a first cassette in a position for being replenished with sheet currency, said first cassette having been removed from an Automated Teller Machine, ATM, and said first cassette, when present in the means for retaining, is located outside an ATM; and a loading mechanism which moves between bottom and top of the first cassette to replenish the first cassette with currency which was validated as non-counterfeit by the validator.

12. System according to claim 11, wherein the receiver accepts currency sheets either individually or in a bunch.

13. System according to claim 11, and further comprising:

(i) a cassette tray for receiving a cassette to be emptied, and (ii) a removal mechanism for removing sheets of currency from a cassette inserted into the cassette tray, and inserting the removed sheets into the first cassette.

14. A method of replenishing a cassette with sheet currency in a self-service terminal, the method comprising the steps of:

removing the cassette from an Automated Teller Machine, ATM;

retaining the cassette in a replenishment terminal different from the ATM, in a position for receiving sheets of currency;

at the replenishment terminal, receiving sheet currency to be used in replenishing the cassette;

using a validator at the replenishment terminal, validating whether the received sheet currency contains counterfeit currency; and using a loading conveyor, accepting from the validator sheet currency validated as non-counterfeit; and loading the sheet currency validated into the cassette to replenish the cassette.

15. A method according to claim 14, further comprising the step of:

(a) checking characteristics of each currency sheet received and rejecting any received sheets not fulfilling a predetermined condition acceptance criterion.

16. A method according to claim 14, further comprising the steps of:

(e) receiving a cassette to be emptied;

(f) removing sheet currency from the received cassette to be emptied, and (g) counting the number of sheets of currency removed from the cassette to be emptied for reconciling the contents of the cassette to be emptied.

* * * * *